United States Patent
Rodriguez et al.

(10) Patent No.: US 7,209,559 B2
(45) Date of Patent: Apr. 24, 2007

(54) METHOD AND APPARATUS FOR SECURELY DISTRIBUTING LARGE DIGITAL VIDEO/DATA FILES WITH OPTIMUM SECURITY

(75) Inventors: Ismael Rodriguez, El Segundo, CA (US); James C. Campanella, Marina del Rey, CA (US)

(73) Assignee: The Boeing Company, Chicago, IL (US)

( * ) Notice: Subject to any disclaimer, the term of this patent is extended or adjusted under 35 U.S.C. 154(b) by 757 days.

(21) Appl. No.: 10/425,235

(22) Filed: Apr. 29, 2003

(65) Prior Publication Data

US 2003/0202661 A1    Oct. 30, 2003

Related U.S. Application Data

(60) Provisional application No. 60/376,244, filed on Apr. 29, 2002.

(51) Int. Cl.
| | |
|---|---|
| H04N 7/16 | (2006.01) |
| H04N 1/46 | (2006.01) |
| H04N 5/222 | (2006.01) |
| H04N 3/38 | (2006.01) |

(52) U.S. Cl. .................. 380/228; 380/228; 713/171
(58) Field of Classification Search ............. 380/228, 380/227; 713/171
See application file for complete search history.

(56) References Cited

U.S. PATENT DOCUMENTS

2001/0029579 A1 * 10/2001 Kusakabe et al. ........... 713/172
2003/0110169 A1 *  6/2003 Zuili et al. ..................... 707/9
2003/0188180 A1 * 10/2003 Overney ...................... 713/193

FOREIGN PATENT DOCUMENTS

EP    1154348 A2 * 11/2001

* cited by examiner

Primary Examiner—Gilberto Barron
Assistant Examiner—Venkat Perungavoor
(74) Attorney, Agent, or Firm—Gates & Cooper LLP

(57) ABSTRACT

A method, apparatus, and article of manufacture provide the ability to securely distribute digital media content from a first entity to a second entity through an intermediate entity. A studio token, comprising information utilized to generate a first key, is generated and distributed to the first entity. A theater token, comprising information utilized to generate a second key, is also generated and then distributed to the second entity. A data file is accepted from the first entity. The data file comprises the media content encrypted according to the first key generated from the studio token, and an authorization header that provides information utilized to generate the second key. The data file is further encrypted according to a third key wherein such further encryption comprises adding a new header to the encrypted media content. The encrypted data file is then distributed to the second entity.

22 Claims, 8 Drawing Sheets

METHOD AND APPARATUS FOR SECURELY DISTRIBUTING LARGE DIGITAL VIDEO/DATA FILES WITH OPTIMUM SECURITY

CROSS-REFERENCE TO RELATED APPLICATIONS

This application claims the benefit under 35 U.S.C. §119 (e) of the following co-pending and commonly assigned U.S. provisional patent applications which is incorporated by reference herein:

U.S. Provisional Patent Application Ser. No. 60/376,244, filed Apr. 29, 2002, by inventors Ismael Rodriguez and James C. Campanella, entitled "METHOD TO SECURELY DISTRIBUTE LARGE DIGITAL VIDEO/DATA FILES WITH OPTIMUM SECURITY".

This application is related to the following co-pending and commonly-assigned patent applications, which applications are incorporated by reference herein:

U.S. Provisional Patent Application Ser. No. 60/376,105, filed Apr. 29, 2002, by inventor Charles F. Stirling, entitled SECURE DATA CONTENT DELIVERY SYSTEM FOR MULTIMEDIA APPLICATIONS UTILIZING BANDWIDTH EFFICIENT MODULATION; and U.S. Provisional Patent Application Ser. No. 60/376,243, filed Apr. 29, 2002, by inventors Bernard Mark Gudaitis and William G. Connelly, entitled "ARCHITECTURE CONTAINING EMBEDDED COMPRESSION AND ENCRYPTION ALGORITHMS WITHIN THE DATA FILE".

BACKGROUND OF THE INVENTION

1. Field of the Invention

The present invention relates generally to distributing media content, and in particular, to a method, apparatus, and article of manufacture for protecting large video and data files during transport over satellite, terrestrial, and magnetic media for use in a digital cinema system.

2. Description of the Related Art

The methods by which movies and other media programs that are distributed to theaters for display to audiences have not substantially changed in over 75 years. Celluloid copies of such movies are distributed to each theater in advance of the first showing, and the same copy is repeatedly displayed for audiences until the movie is excessively worn, the license expires, or the theater stops showing the movie in favor of a more popular movie.

There are several problems with this process. First, the process of manually and securely distributing physical celluloid copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. As will be described further herein, the present invention solves that need by providing for the distribution of digital copies of media programs via a satellite or other high bandwidth medium. For example, digital cinema systems provide the ability for distributing digital copies of motion picture "films" electronically directly to theatres running exhibitor systems.

However, the use of digital cinema systems presents additional challenges. For example, the owners of the media content must ensure that the content is secure at all stages of the distribution and exhibition process. Traditional security methods of file distribution include the transmission and/or delivery of encryption/decryption keys over networks or satellites. The current key distribution and management functionality has many complicated mechanisms to mitigate the risks of unauthorized access to valuable content. In this regard, content owners have to rely on expensive and complicated digital certificates and public key infrastructure (PKI) architectures to authenticate users and protect keys being distributed over the networks. Further, PKI and digital certificate architectures have been compromised in the past and have some known vulnerabilities. For example, keys can be copied at the weak points in the distribution, thus compromising the confidentiality of the applicable content. Once a key falls in the wrong hands, the potential losses can be insurmountable.

In view of the above, what is needed is the capability to protect digital media content without the complicated key distribution and management problems of the prior art.

SUMMARY OF THE INVENTION

In summary, embodiments of the invention provide for the distribution and management of authorization tokens (from a distribution entity 106) that allows a source server (upon successful authentication) to create a working key for encryption of a large video or data file. The process may also insert a small encrypted header in the file that can only be seen by the intended user with the proper authorization token and password. The key is discarded after the encryption process is completed and is never stored. The encrypted file may then travel securely to a destination server. The intended user at the destination server will need a corresponding authorization token (sent by the distribution entity 106) and associated password in order for the software agent on the server to successfully recreate the key for decryption. The keys are created when the authorization token compares a user password (e.g., in a dongle), and file header for authentication.

During the transport of the video or data file, a second level of encryption may be applied to the file to ensure it is received by authorized recipients only. Those systems with non-authorized receivers will drop the packets due to wrong authentication (e.g., a smart card may be used for such authentication).

The authorization tokens are sent over the internet or dial up connection to intended destination servers using VPN communications.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention utilize an innovative approach where keys for encryption and decryption are created at the source and destination file servers during file creation and usage only. The process of creating a key is initiated every time there is a need to encrypt or decrypt the content and then these keys are disregarded (e.g., never stored and never leave the servers). Additionally, once the content is encrypted, the content is re-encrypted for transmission over satellite or terrestrial fiber networks. This second encryption layer ensures the content is received by intended recipients only. Such a system provides a very secure, simple to use, and reliable file distribution system that may provide many advantages (e.g., lower transmission overhead, cost, and time for delivery to intended recipients).

Hardware Environment

Figure 1A:
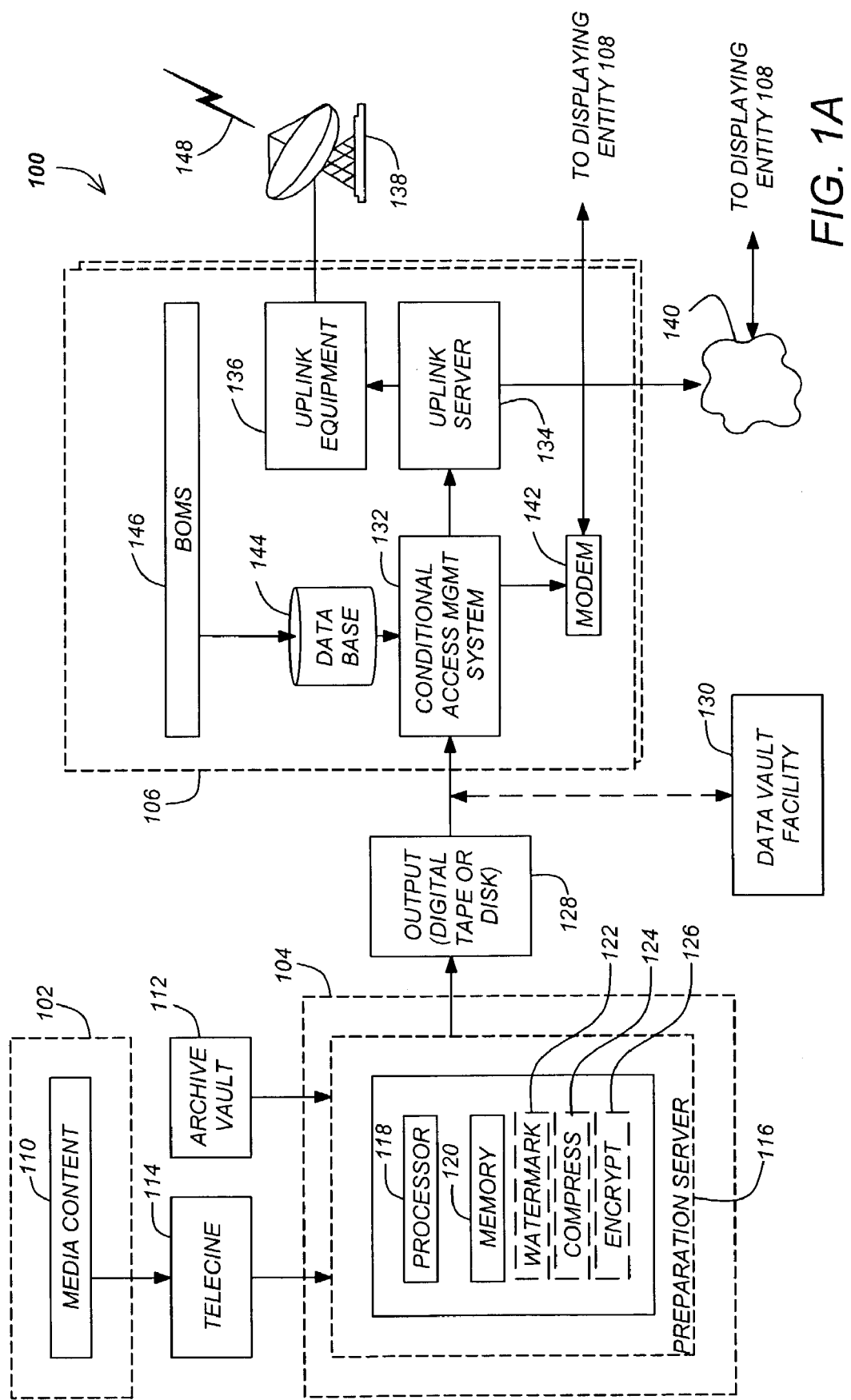
FIGS. 1A and 1B depict a top-level functional block diagram of a media program distribution system in accordance with one or more embodiments of the invention.
Figure 1B:
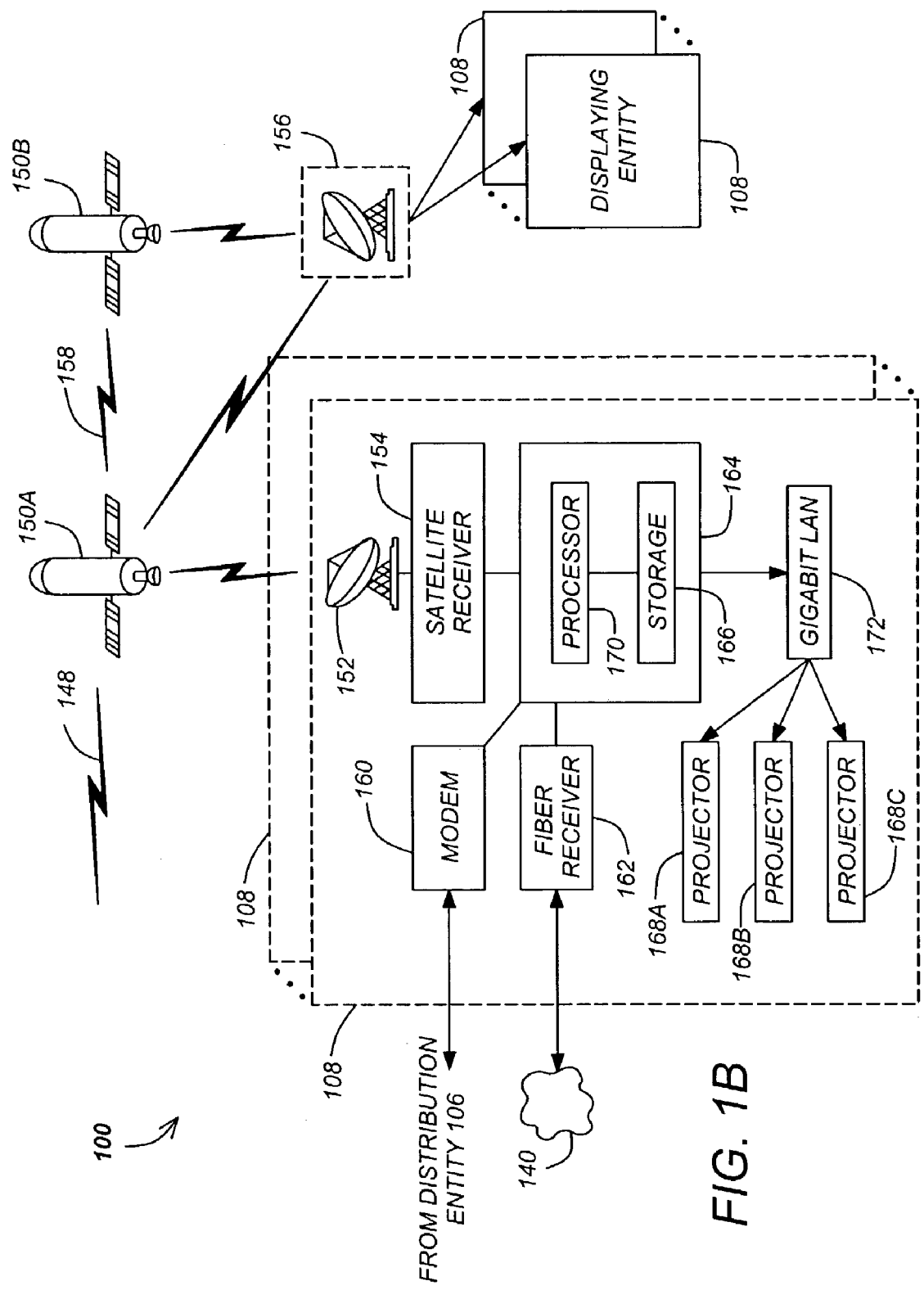

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation server 116. In one embodiment, the media preparation server 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation server 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laserdisk, or similar medium). The output media content 128 can then be archived in a data vault facility 130 until it is needed.

When needed, the prepared output media content 128 is then provided to the distribution entity 106 (alternatively referred to hereinafter as the network operations center [NOC]). Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136 and uplink antenna 138.

Also, as shown, in addition or in the alternative to transmission via satellite, the media program can be provided to the displaying entity 108 via a forward channel fiber network 140. Additionally, information may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. billing, authorization, usage tracking, etc.), while the satellite network provides for transfer of the output media content 128 to the displaying entities 108.

The output media content 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Turning to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

Figure 2:
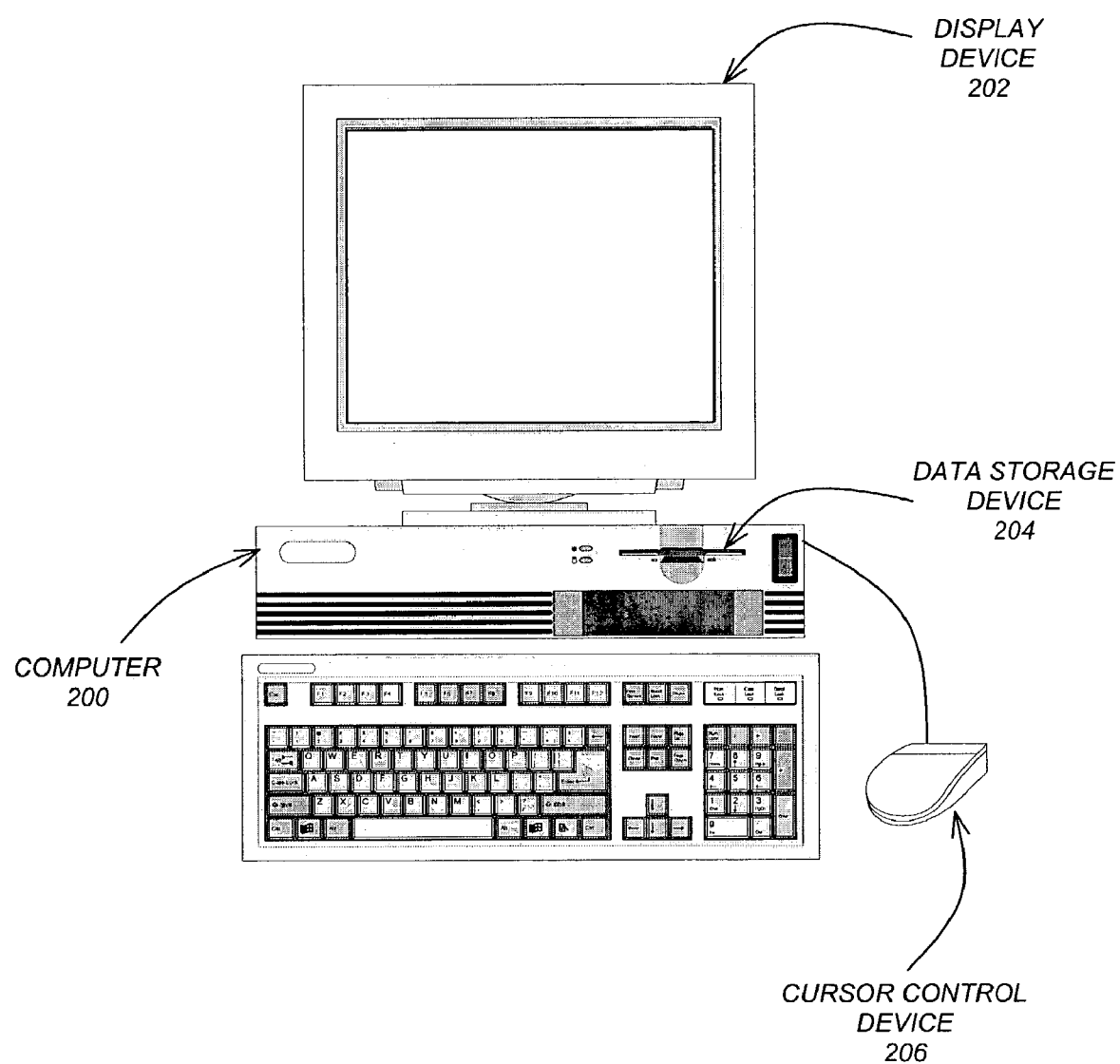
FIG. 2 is a functional block diagram of a computer system in accordance with one or more embodiments of the invention.

A typical displaying entity 108 comprises a modem 160 (and may also include a fiber receiver 162) for receiving and transmitting information through the back channel (i.e., via a communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output media content 128 and other information may be accepted into a processing system 164 (also referred to as a content server) such as a server or computer similar to that which is illustrated in FIG. 2 (see description below). The output media content 128 may then be stored in the storage device 166 for later transmission to displaying systems (e.g., digital projectors) 168A–168C. Before storage, the output media content 128 can be decrypted to remove transmission encryption (e.g. any encryption applied by the CAMS 132), leaving the encryption applied by the preparation server 116.

When the media content 110 is to be displayed, final decryption techniques are used on the output media content 128 to substantially reproduce the original media content 110 in a viewable form that is provided to one or more of the displaying systems 168A–168C. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A–168C over an independently encrypted connection, such as on a gigabit LAN 172.

FIG. 2 is a functional block diagram of a computer system 200 that can be used to perform the operations of the media preparation server 116 and processing system 164. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 100.

Programs executing on the computer 200 (such as an operating system) are comprised of instructions which, when read and executed by the computer 200, causes the computer 200 to perform the steps necessary to implement and/or use the present invention. Computer programs and/or operating instructions may also be tangibly embodied in a memory and/or data communications devices of the computer, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Security Overview

Figure 3:
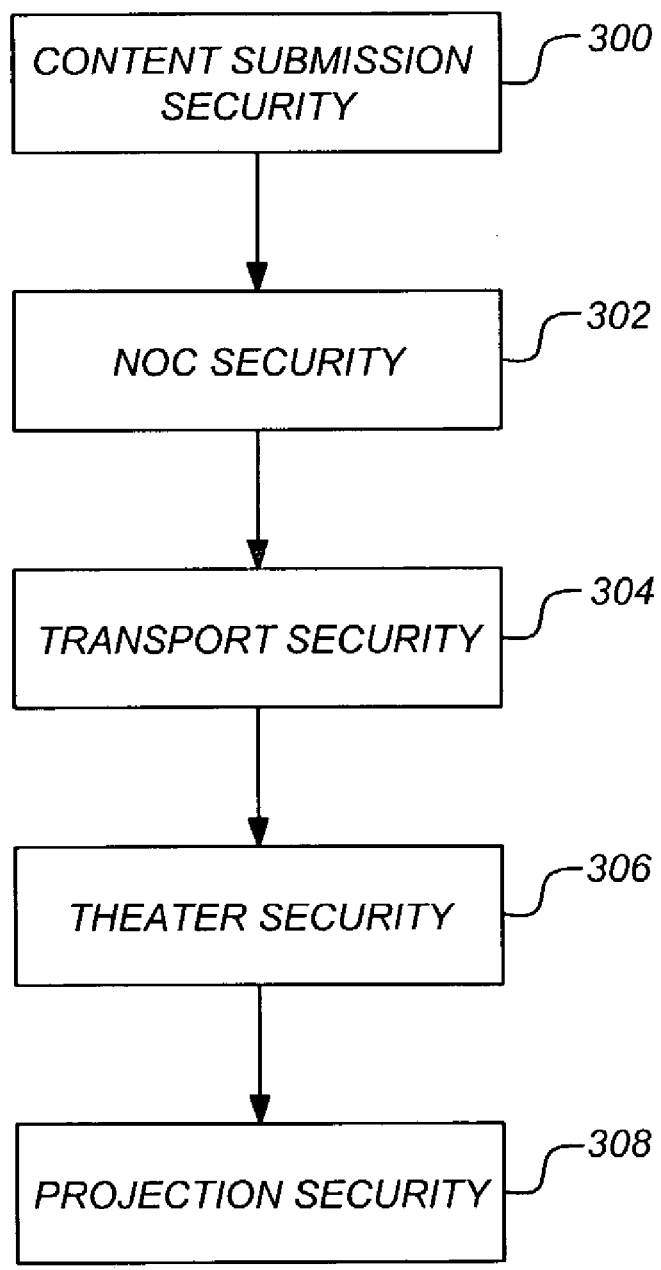
FIG. 3 is a flow chart illustrating an approach for content delivery security in accordance with one or more embodiments of the invention.

FIG. 3 is a flow chart illustrating an approach for content delivery security in accordance with one or more embodiments of the invention. In FIG. 3, a flexible security environment is utilized to protect the distribution of all forms of digital content against known threats. In this regard, a multi-layered security architecture encompassing strong encryption and watermarking technologies provides absolute protection and auditing of content end-to-end. At step 300, the content provider 102 provides for content submission security. For example, such security may provide for virus scanning, watermarking (at a first level), encryption of the content (e.g., using CKM™/TecSec™ encryption [also referred to as FileSec encryption][an encryption technology available from TecSec, Incorporated], and file integrity may be applied.

At step 302, network operations center (referred to as a NOC or distribution entity 106) security is provided. This level of security may provide for access control (e.g., at the site of the distribution entity 106, by user, and/or using various protocols). Additionally, virus scanning may occur, a further check of file integrity may be conducted, and an Ack may be received.

At step 304, the environment provides for transport security. Transport security provides for securing the media content for transmission for and during distribution to display entities 108. In such an embodiment, the media content may be encrypted again (e.g., referred to herein as the TranSec [transmission security] encryption). Also, conditional access may be applied, keys (for the encryption) may be managed, and intrusion detection may be implemented and managed.

At step 306, the environment provides for theater security. Theater security provides for the secure receipt and decryption of media content at the display entity 108. Such security may provide for conditional access authentication, file integrity checks, Ack reception, decryption (e.g.,. TranSec decryption), and encrypted storage (e.g., while content is still encrypted [i.e., through FileSec encryption]).

At step 308, the environment provides for projection security for delivery of the content from within the display entity 108 (e.g., from gigabit LAN 172) to various projectors 168. To provide such security, playout users may be authenticated and the content may be decrypted (e.g., FileSec decryption), and further encryption of the content may be implemented (e.g., link encryption).

Once received by the projectors 168, final security issues may be implemented. Such an implementation may include final decryption of the data (e.g., link decryption), the content may be watermarked (at a second level), and camcorder jamming techniques.

Accordingly, the security illustrated in FIG. 3 provides a general overview of the methodology utilized to secure content throughout a digital cinema system.

Secure Theater Content Distribution Data Flow

Figure 4A:
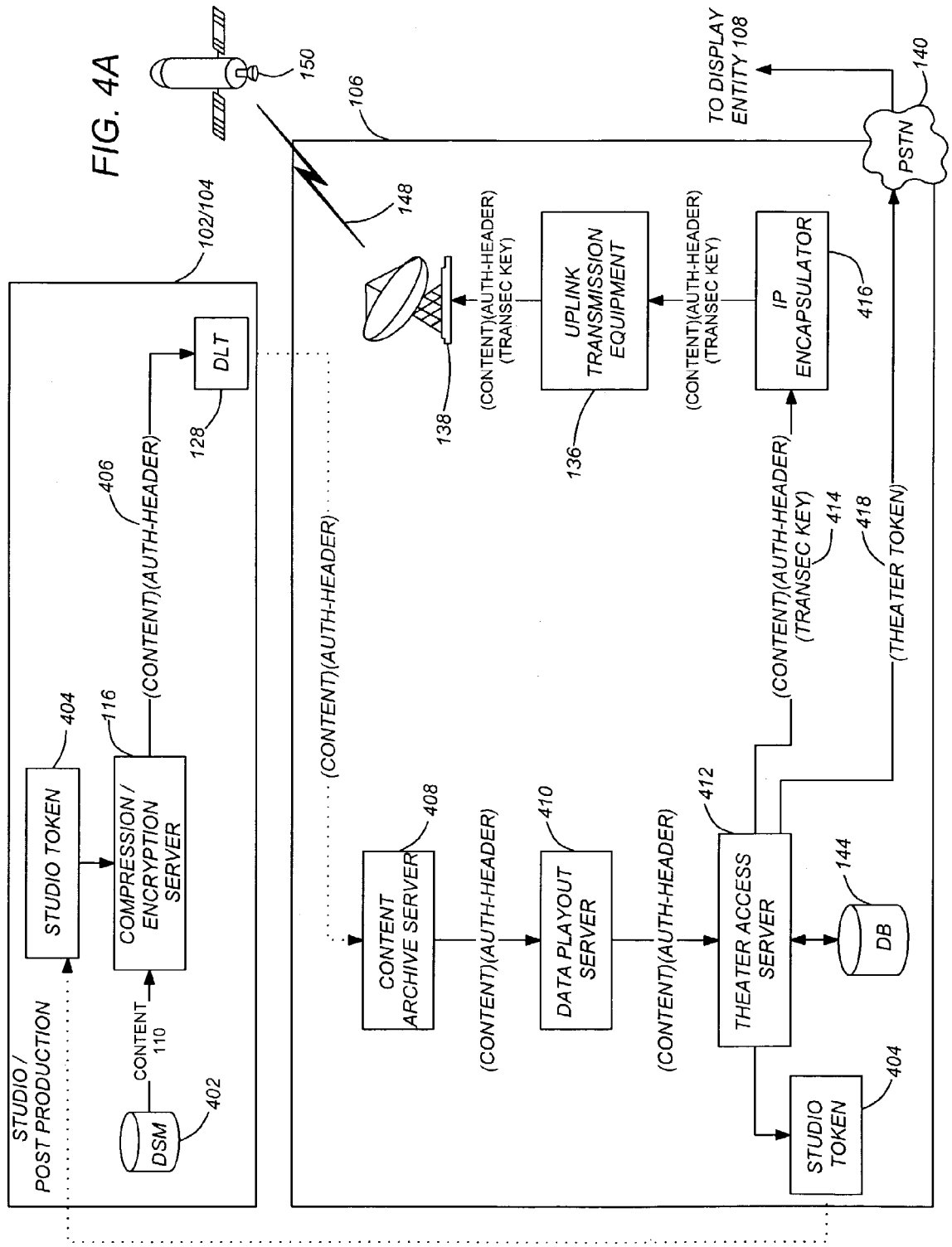
FIGS. 4A and 4B illustrate a secure theater content distribution data flow in accordance with one or more embodiments of the invention.
Figure 4B:
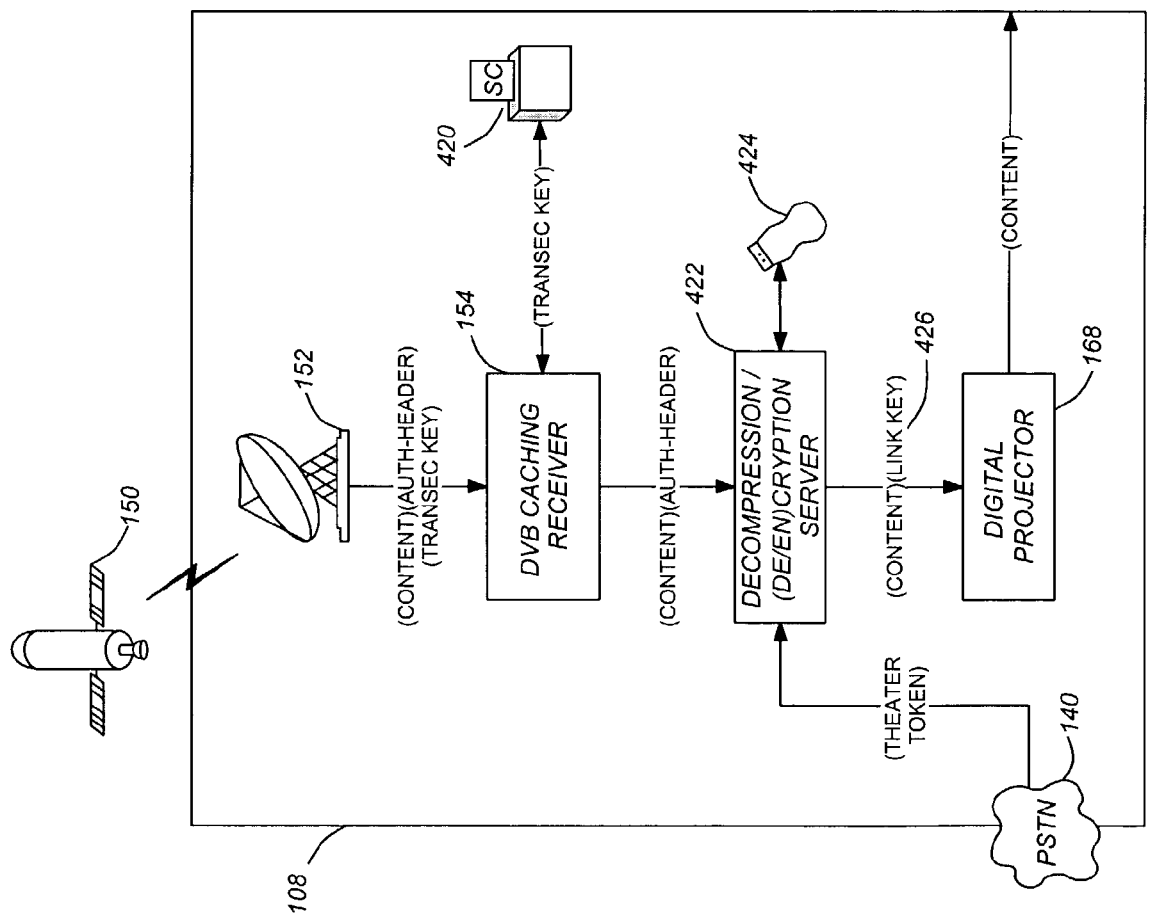

FIGS. 4A and 4B illustrate a secure theater content distribution data flow. Referring to FIG. 4A, a studio/post-production facility (i.e., in a media content provider 102 and protection entity 104) prepares the content 110 for distribution to the distribution entity 106. As illustrated, digital media content 110 such as a movie is obtained from a digital source master 402. Using a studio token, a compression/encryption server 116 prepares (e.g., compresses and encrypts) the content 110. As used herein the studio token 404 may comprise a software code delivered to the studio/post production facility 102/104 (e.g., on a floppy disk). The compression/encryption server 116 authenticates the studio token 404 to determine if the studio token 404 received is the studio token 404 expected (i.e., whether the password in the studio token 404 is authentic/valid). In this regard, a variety of authentication techniques may be utilized to authenticate the studio token 404. For example, a dongle may be utilized to authenticate the studio token 404 (as described in more detail below with respect to a theater token). Further, a password in the dongle may be used to authenticate a user. Alternatively, a stronger authentication mechanism (e.g., biometrics such as fingerprint, or retinal scan readers) may also be used to authenticate the user.

If the studio token 404 is authentic, the studio token 404 is unwrapped (i.e., into a usable form). A random number generator within the compression/encryption server 116 and a CKM (constructive key management) agent (available from TecSec Incorporated) utilize the studio token 404 to produce a key. The key (referred to as the TecSec™ key) may then be utilized by the compression/encryption server 116 to encrypt the content 110. In addition, the compression/encryption server 116 encrypts an authorization header 406 for the content 110. The authorization header 406 provides a formula/information that enables another random number generator to generate the same random number that was utilized during the key generation process. While specific encryption methods are described herein, any type of encryption may be utilized in accordance with this invention. For example, AES (advanced encryption standard), CKM encryption, Blowfish encryption, Diffie-Helman encryption, etc. may be utilized wherever a specific method of encryption is described herein.

Once the content 110 is encrypted, the generated key is destroyed/discarded and is not stored. Accordingly, the compression/encryption server 116 encrypts the content 110 and also encrypts relevant information in a small authorization header 406. The encrypted content 110 and authorization header 406 is therefore in a protected form for delivery to a distribution center. Once compressed/encrypted, the content 110 and authorization header 406 may be stored in a protected form on any digital storage medium (e.g., on a digital tape (DLT) 128, disk, etc.). The protected data 128 may then be delivered to the distribution entity 106.

The protected content 110 and authorization header 406 are delivered to a content archive server 408 where the content may be stored for later use. When desired, the protected content 110 and authorization header 406 are forwarded to the data playout server 410. The data playout server 410 is responsible for streaming the data to a theater access server 412 for further processing.

The theater access server 412 receives the content 110 and authorization header 406 from the data playout server 410. The theater access server 412 may then store the content 110 and authorization header 406 in database 144 (as described above). To ensure that the content is secure during transmission via satellite 150, the theater access server 412 may be responsible for a further second level of encryption of the protected content 110 and authorization header 406. Accordingly, using a key (referred to as a TranSec key), the theater access server 412 further encrypts all of the data received (i.e., the media content 110 and authorization header 406). As described above, any encryption method/algorithm may be utilized by theater access server 412 (e.g., using encryption technology from Irdeto Access, TecSec, etc.).

Once encrypted, the theater access server adds a new header onto the package containing the content 110 and the authorization header. In FIG. 4A, the new header is illustrated as the TranSec Key 414. The new header 414 shields all of the prior header information (i.e., the authorization header 406) so that the content provider 102, distribution entity 106, display entity 108, and content 110 cannot be determined.

The content 110, authorization header 406, and TranSec key 414 (hereinafter referred to as data package) are then transmitted/delivered to an IP Encapsulator 416. The IP Encapsulator 416 converts the data package into a different form (e.g., MPEG) for uplink and distribution. Accordingly, the converted data package is processed by uplink transmission equipment 136 where it is transmitted via uplink antenna 138 to satellite 150 via link 148.

Prior to describing the processing by display entity of the data package, the explanation of further processing conducted by theater access server 412 is useful. In addition to the functionality described above, the theater access server 412 within distribution entity 106 is also responsible for managing tokens. As used herein, the tokens (e.g., studio token 404 and theater token 418) may be any software or hardware device utilized to create a key that is used for encryption/decryption. Further, while theater access server 412 may generate and manage tokens 404 and 418, the keys used to encrypt/decrypt content 110 at the studio 402 or post production facility 404 are not created, received, or stored at the distribution server 106.

As illustrated in FIG. 4A, the studio token 404 is created by the theater access server 412 for delivery/transmission to studio/post production facility 102/104. As described above, the studio token 404 may be software code on a floppy disk that is delivered from the distribution entity 106 to the studio/post production facility 102/104. Further, the content of a studio token 404 or theater token 418 may comprise credentials, the name of the media content 110 (e.g., movie title), an expiration date for the token 404, etc.

As described above, the studio token 404 is utilized by the studio/post production facility 102/104 to obtain a key for encryption of the media content 110. However, since the token 404 may be unique and custom for studio/post production facility 102/104 or a machine at the facility, the same studio token 404 may not be utilized by another entity to decrypt the content. Accordingly, theater access server 412 also generates a theater token 418. The theater token 418 is delivered to the display entity 108 across fiber network 140 (also referred to as PSTN [public switched telephone network]). Details regarding the use of the theater token are described below.

Referring now to FIG. 4B, the receipt and processing of media content 110 by the display entity 108 will be described. The protected data package is transmitted via satellite 150 and received via downlink antenna 152 into satellite/digital video broadcast (DVB) caching receiver 154.

The DVB caching receiver 154 is responsible for initial decryption of the data package. Accordingly, to decrypt the data package, the key is needed. The TranSec Key 414 is received in the data package. However, the TranSec key 414 is also encrypted as described above. To decrypt the TranSec key 414 so that the data package may be decrypted, a smart card 420 is utilized. The use of the smart card 420 to authenticate and decrypt the TranSec key 414 ensures that only those recipients (e.g., DVB caching receiver 154) having a smart card with appropriate authorization may receive/decrypt the data package. Accordingly, the DVB caching receiver 154 communicates with the smart cart 420. In this regard, the encrypted TranSec key 414 is forwarded to the smart card 420. If the smart card 420 is able to verify and confirm the authorization of the TranSec key 414, the decrypted TranSec key 414 is then transmitted back to the DVB caching receiver 154.

The DVB caching receiver 154 utilizes the decrypted TranSec key 414 to decrypt the data package (i.e., to remove the encrypted added by distribution entity 106 for transmission security). Subsequent to decryption, the data package merely comprises the media content 110 and authorization header 406. The media content 110 and authorization header are then forwarded to the decompression/decryption server 422. The decompression/decryption server 422 is responsible for decompressing and decrypting the media content (as encrypted by the studio/post production facility 102/104).

In order to decompress/decrypt the media content, the appropriate key must be determined. However, as described above, the actual keys are not transmitted and are destroyed after use. Accordingly, the decompression/decryption server 422 must generate the key used to decompress/decrypt the media content 110. To generate the key, decompression/decryption server 422 needs the appropriate token. In this regard, the theater token 418 generated by the theater access server 412 is received via the fiber network 140 in the decompression/decryption server 422. However, the theater token 418 is received from theater access sever 412 in an encrypted form.

Any method may be utilized to decrypt the theater token 418. For example, a dongle 424 may be utilized in the invention. Such a dongle 424 could contain a 32-bit identification. The encrypted theater token 418 is forwarded to the dongle 424. A processor within the dongle 424 (or a separate software agent) may be utilized to validate a password (e.g., a user password and/or the 32 bit identification) and the information within the authorization header 406. Thus, the dongle 424 (i.e., a password in the dongle) may be utilized to authenticate a user. Alternatively, a stronger user authentication may also be utilized (e.g., biometrics such as fingerprint or retinal scan readers). Once the user has been authenticated, and/or if the theater token 418 is valid, the theater token 418 is decrypted and provided to the decompression/decryption server 422.

Once the decompression/decryption server 422 receives the decrypted theater token 418, the key to decrypt the media content 110 may be generated. Accordingly, the information in the authorization header 406 is utilized to generate the same random number used during encryption by the compression/encryption server 116. The random number, token, and decompression/decryption algorithm may then be used to generate the decryption key. Accordingly, the key is first created and used by the compression/encryption server 116, discarded, and then recreated at the destination (i.e., by the decompression/decryption server 422).

The decompression/decryption server 422 utilizes the generated key to decrypt the media content 110. Once the media content 110 is decrypted, the key is destroyed/discarded.

However, although the content is in a decrypted form at the display entity 108, the content 110 must be further secured during transmission to individual projectors 168 within the display entity 108. In this regard, the content 110 is encrypted using a link key 426 for transmission during the link between the decompression/decryption server 422 and digital projector(s) 168. The digital projectors 168 then decrypt the content 110 upon receipt for actual display on a screen. Additionally, to prevent piracy, the digital projector 168 may also implement camcorder jamming and watermarking to prevent copying of the content 110 as it is displayed.

The above description with respect to FIGS. 4A and 4B provides for the secure distribution of media content 110. As described, a distribution entity 106 is utilized to generate various tokens (i.e., the studio token 404 and theater token 418) that are distributed to the studio/post production facility 102/104 and the display entity 108. The studio/post production facility 102/104 utilizes the token to generate an encryption key. The encryption key is utilized to encrypt the media content 110 and is then destroyed. The media content is transmitted to the distribution entity 106 where the content 110 is further encrypted for transmission to the display entity 108 via satellite 150. Upon receipt at the display entity 108, a smart card is utilized to decrypt the content 110 as encrypted by the distribution entity 106. The theater token 418 is then used (e.g., in combination with a dongle 424) to create a decryption key that is used to decrypt the content 110. The content is then encrypted once again for transmission to projectors 168.

Theater Network Management Data Flow

Figure 5:
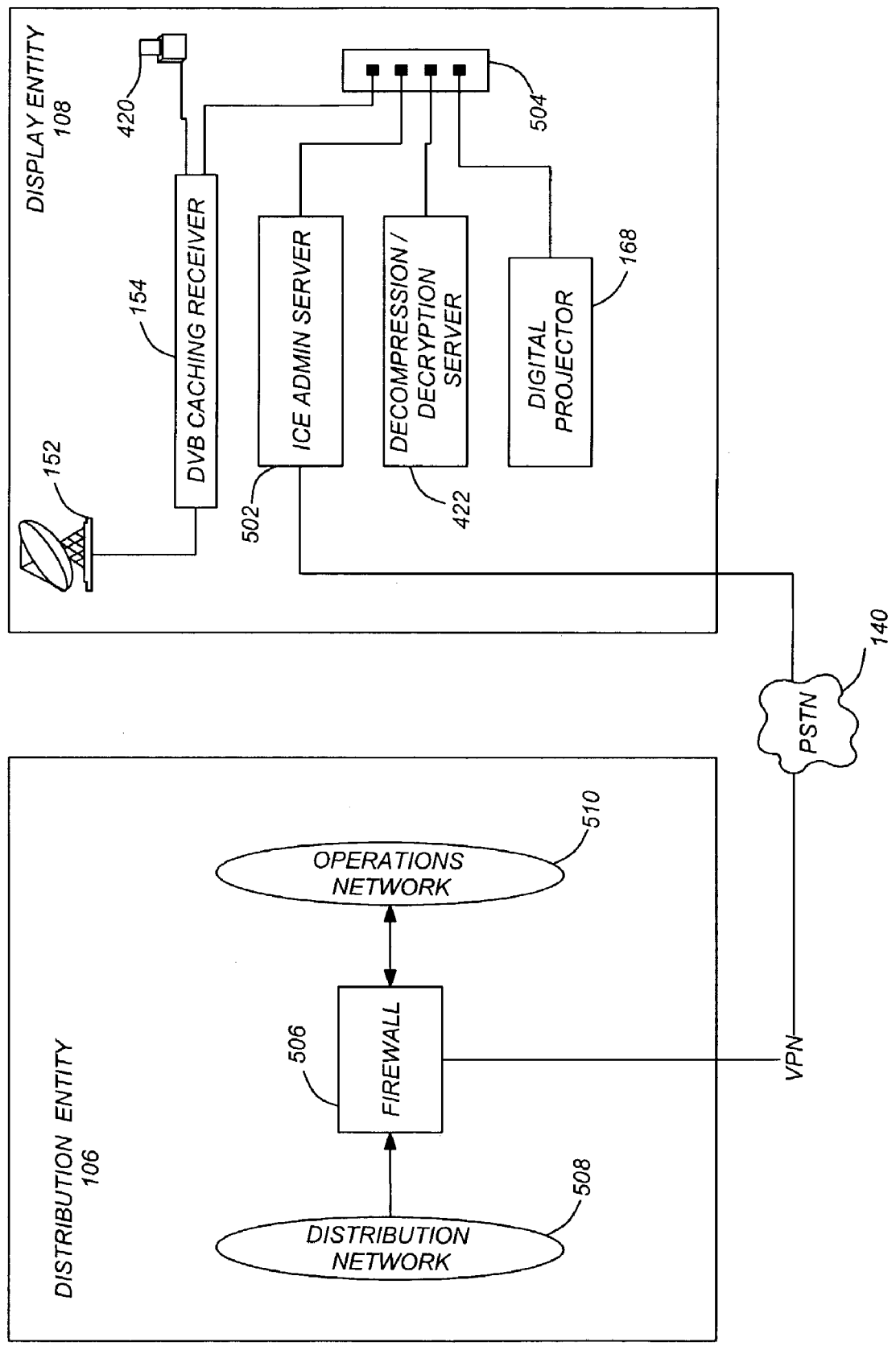
FIG. 5 illustrates a secure theater network management data flow and intra-distribution connectivity security in accordance with one or more embodiments of the invention.

FIG. 5 illustrates a secure theater network management data flow and intra-distribution connectivity security. As used herein, all of the cinema equipment (i.e., within display entity 108) employed in the invention (e.g., the DVB caching receiver 154, decompression/decryption server 422, digital projector 168, etc.) can be collectively referred to as in-cinema equipment (ICE). Accordingly, as described above, the in-cinema equipment receives, stores and plays out the content 110 or source video. An ICE administration server 502 is communicatively coupled 504 to the display entity 108 equipment. The ICE can provide for the delivery of digital content 110 (feature length movies, advertisements, trailer, and live content) via satellite 150, with a secondary method via DVD, and allows play out of the content 110 through the digital projector 168.

The ICE administration server 502 also manages communication between a display entity 108 and distribution entity 106 across fiber network 140. To ensure security, such communication may only be permitted across a virtual private network (VPN). As illustrated, a firewall 506 may be utilized to prevent improper access into distribution entity 106. As illustrated, a secure theater network provides for file error correction, key/token management, and network management (e.g., the health and status of the network, software upgrades, etc.).

Within distribution entity 106, two networks may exists—distribution network 508 and operations network 510. Both distribution network 508 and operations network 510 are established within distribution entity 106 as mission critical network segments. Communications with the operations network 510 must be initiated from within the distribution network 508 and external communication with the operations network 510 are encrypted.

Through the firewall 506 and limited communications, both distribution network 508 and operations network 510 have access protection. For example, distribution network 508 is guarded against any external access such as from the Internet, a mastering house (e.g., post production facility 104), or a display entity 108. Similarly, operations network 510 is guarded against unauthorized access from the Internet, a mastering house, or a display entity 108. Thus, as illustrated, all communications within the distribution entity 106 are limited by and must take place through firewall 506.

In addition to the software/hardware security described above, physical measures may also be taken to ensure the security of the distribution entity 106. For example, building access may be secured 24 hours a day, 7 days a week by a security card wherein secure card entry for both building and elevators after business hours is required. Additional physical measures on the floor where a distribution entity 106 is located may also be implemented. For example, floor access may be secured 24 hours a day, 7 days a week, with a receptionist verifying access from 9:00 AM to 5:00 PM, and secure card entry required all other times.

Accordingly, further secure card entry and/or exit may be required to/from an office where vital information may be secured/stored with entry and exit auditing possible (e.g., via a security service or assignee of the present invention). Additionally, a 24 hour, 7 days a week, two person integrity rule may be enforced (e.g., wherein no more than two persons may have access to a secure area at any given time). Further, proprietary materials (e.g., digital content DVDs or tapes, client sensitive documents, etc.) may be stored within a safe in the distribution center.

Additional physical security may be enabled at the display entity 108. For example, equipment rack contents may be protected with cabinet locks on both the front and back doors of a cabinet in which they are located. In such an embodiment, the keyboard and monitor may be accessible without unlocking the cabinet. Further, keys may be controlled by a single exhibitor monitor. Additional physical security measures may be dependent on the exhibitor manager. In this regard, the exhibitor manager may need to comply with particular guidelines that may be adjusted from time to time.

Further security measure may also be taken that do not contradict the security management described herein. For example, additional watermarking techniques may be utilized. Further, connectivity between the mastering house (i.e., the studio/post-production facility 102/104) and the distribution entity 106 may be further enabled/enhanced. Key/token management may also be streamlined from end-to-end. Further, role based access control may be maintained with additional system tampering protection and camcorder jamming techniques.

Logical Flow for Secure Distribution of Digital Media Content

Figure 6:
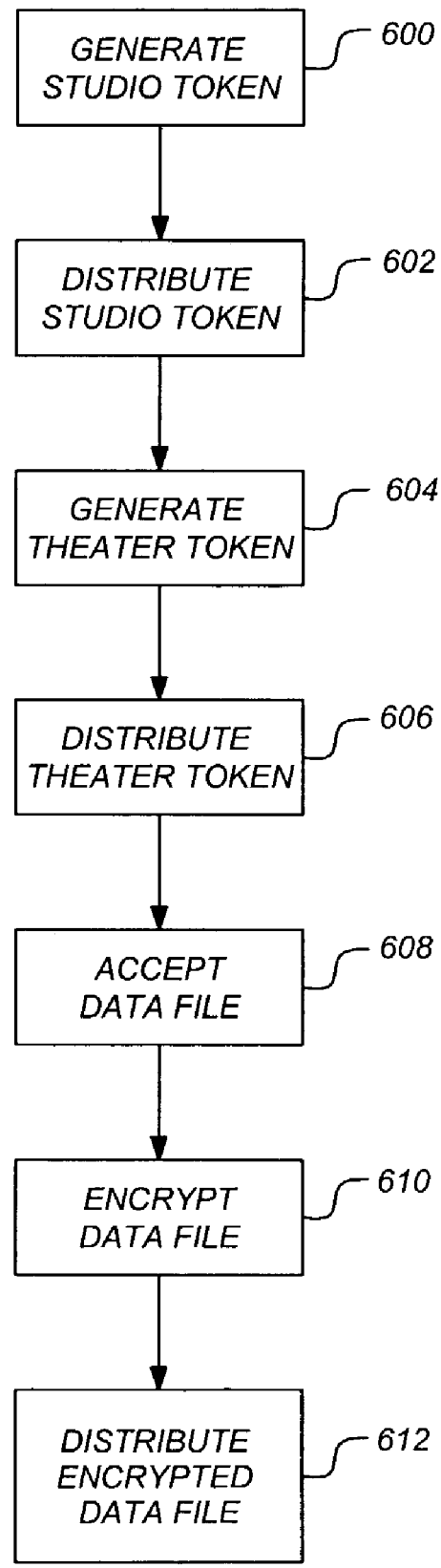
FIG. 6 is a flow chart that illustrates the logical flow for secure distribution of media content (e.g., from a first entity to a second entity through an intermediate entity) in accordance with one or more embodiments of the invention.

FIG. 6 is a flow chart that illustrates the logical flow for secure distribution of media content (e.g., from a first entity to a second entity through an intermediate entity) in accordance with one or more embodiments of the invention. At step 600, a studio token 404 is created (i.e., at the intermediate entity). The studio token 404 comprises information utilized to generate a first key (e.g., a constructive key management [CKM] key). In this regard, the studio token 404 may also comprise information that authorizes the first entity to generate the first key.

At step 602, the studio token 404 is distributed (e.g., on disk or electronically) to the first entity (e.g., the studio/post production facility 102/104). At step 604, a theater token 418 is generated. The theater token 418 comprises information utilized to generate a second key (e.g., a CKM key). At step 606, the theater token 418 is distributed to the second entity (e.g., the display entity 108). Such a theater token 418 may be validated/authenticated and/or decrypted at the second entity using a dongle.

At step 608, a data file is accepted from the first entity (e.g., from the studio/post-production facility 102/104). As described above, the data file comprises the media content 110 encrypted according to the first key generated from the studio token, and an authorization header 406. In this regard, the studio token may be utilized with a random number generator to generate the first key (e.g., at a first location of the first entity). Further, it should be noted that the first key may be discarded/destroyed subsequent to use/encryption.

At step 608, the data file is further encrypted according to a third key. Such further encryption comprises adding a new header to the data file/encrypted media content 110. Such a new header may mask information regarding the media content 110, the originator of the media content (i.e., the first entity), and the destination of the media content (i.e., the second entity). Lastly, at step 612, the encrypted data file is distributed to the second entity (e.g., the display entity 108).

As described above, to obtain the unencrypted theater token 418 (to be used to decrypt the content 110), a password in the dongle 424 may be utilized to authenticate the user. Once the user has been authenticated, a processor within the dongle 424 may decrypt the theater token 418 for use in generating the second key.

The authorization header 406 provides information utilized to generate the second key with the decrypted theater token 418. For example, the authorization header 406 may comprise information authorizing the second entity (i.e., the display entity 108) to generate the second key (e.g., using properties provided in information within the authorization header 406 that are utilized by a random number generator). Such a second key may be generated at a second location of the second entity. The second key may then be used (e.g., by the display entity 108) to decompress/decrypt the media content 110. Subsequent to such use/decryption, the second key may be discarded/destroyed. Accordingly, the content 110 has been maintained securely from the content provider 102 to the display entity 108.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide for the distribution and management of authorization tokens (from a distribution entity 106) that allows a source server (upon successful authentication) to create a working key for encryption of a large video or data file. The process may also insert a small encrypted header in the file that can only be seen by the intended user with the proper authorization token and password. The key is discarded after the encryption process is completed and is never stored. The encrypted file may then travel securely to a destination server. The intended user at the destination server will need a corresponding authorization token (sent by the distribution entity 106) and associated password in order for the software agent on the server to successfully recreate the key for decryption. The keys are created when the authorization token compares a user password (e.g., in a dongle), and file header for authentication.

During the transport of the video or data file, a second level of encryption may be applied to the file to ensure it is received by authorized recipients only. Those systems with non-authorized receivers will drop the packets due to wrong authentication (e.g., a smart card may be used for such authentication).

The authorization tokens are sent over the internet or dial up connection to intended destination servers using VPN communications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for securely distributing a digital copy of a motion picture film from a Film Source Entity (FSE) to a Digital Cinema Theater (DCT) through a distribution center, comprising:
   (a) generating a studio token at the distribution center, wherein the studio token comprises information utilized to generate a first key;
   (b) distributing the studio token from the distribution center to the FSE, wherein:
      (i) the studio token is unique for the FSE and cannot be used by another entity for decryption purposes;
      (ii) the first key is generated at the FSE using a random number generated by a first random number generator and the studio token; and
      (iii) the first key is used, by the FSE, to encrypt the digital copy of the motion picture film;
   (c) generating a theater token at the distribution center, wherein:
      (i) the theater token comprises information utilized by the DCT to generate a second key; and
      (ii) the second key is used by the DCT to decrypt the digital copy of the motion picture film encrypted using the first key;
   (d) distributing the theater token from the distribution center to the DCT;
   (e) accepting a data file at the distribution center from the FSE, wherein the data file comprises:
      (i) the digital copy of the motion picture film that has been encrypted according to the first key;
      (ii) an authorization header generated at the FSE, wherein the authorization header provides information utilized to generate the second key;
   (f) encrypting the data file at the distribution center according to a third key and adding a new header to the encrypted data file; and
   (g) distributing the further encrypted data file from the distribution center to the DCT, wherein the DCT generates the second key using the theater token and the random number generated by a second random number generator using information provided by the authorization header.

2. The method of claim 1, wherein the studio token further comprises:
   credentials;
   a name of the digital copy of the motion picture film; and
   expiration data.

3. The method of claim 1, wherein the first key is a constructive key management (CKM) key.

4. The method of claim 1, wherein the second key is a constructive key management (CKM) key.

5. The method of claim 1, wherein the studio token further comprises information authorizing the FSE to generate the first key.

6. The method of claim 1, wherein the theater token further comprises information authorizing the DCT to generate the second key.

7. The method of claim 1, further comprising a dongle at the second entity authenticating a user.

8. The method of claim 1, wherein the studio token is distributed to the FSE on a disk.

9. The method of claim 1, wherein the first key is discarded subsequent to encrypting the digital copy of the motion picture film, and the second key is discarded subsequent to decrypting the digital copy of the motion picture film.

10. The method of claim 1, wherein the new header masks information regarding the digital copy of motion picture film, the FSE, and the DCT.

11. The method of claim 1, wherein the first key and second key are generated at a first location of the FSE and a second location of the DCT.

12. A system for securely distributing a digital copy of a motion picture film from a Film Source Entity (FSE) to a Digital Cinema Theater (DCT) through a distribution center, the system comprising:
   (a) a studio token, wherein;
      (i) the studio token is generated at the distribution center and comprises information utilized to generate a first key at the FSE; and
      (ii) the studio token is unique for the FSE and cannot be used by another entity for decryption purposes;
   (b) a theater token, wherein the theater token is generated at the distribution center and comprises information utilized to generate a second key at the DCT;
   (c) a data file comprising:
      (i) the digital copy of the motion picture film that has been encrypted, by the FSE, according to the first key generated from a random number generated using a first random number generator and the studio token;
      (ii) an authorization header, wherein the authorization header was generated at the FSE and provides information utilized to generate the second key;
   (d) the distribution center configured to:
      (i) distribute the studio token to the FSE;
      (ii) distribute the theater token to the DCT;
      (iii) accept a data file from the FSE
      (iv) further encrypt the data file according to a third key and add a new header to the encrypted data file; and
      (v) distribute the encrypted data file to the DCT; and
   (e) the DCT configured to:
      (i) generate the second key using the theater token and the random number generated by a second random number generator using information provided by the authorization header; and
      (ii) decrypt the digital copy of the motion picture film using the generated second key.

13. The system of claim 12, wherein the studio token further comprises:
   credentials;
   a name of the digital copy of the motion picture film; and
   expiration data.

14. The system of claim 12, wherein the first key is a constructive key management (CKM) key.

15. The system of claim 12, wherein the second key is a constructive key management (CKM) key.

16. The system of claim 12, wherein the studio token further comprises information authorizing the FSE to generate the first key.

17. The system of claim 12, wherein the theater token further comprises information authorizing the DCT to generate the second key.

18. The system of claim 12, further comprising the DCT configured to authenticate a user utilizing a dongle.

19. The system of claim 12, wherein the studio token is distributed to the FSE on a disk.

20. The system of claim 12, wherein the first key is discarded subsequent to encrypting the digital copy of the motion picture film, and the second key is discarded subsequent to decrypting the digital copy of the motion picture film.

21. The system of claim 12, wherein the new header masks information regarding the digital copy of the motion picture film, the FSE, and the DCT.

22. The system of claim 12, wherein the first key and second key are generated at a first location of the FSE and a second location of the DCT.

* * * * *